ated upon the main carriage and the pivotal carriage is provided with a quad-
UNITED STATES PATENT OFFICE.

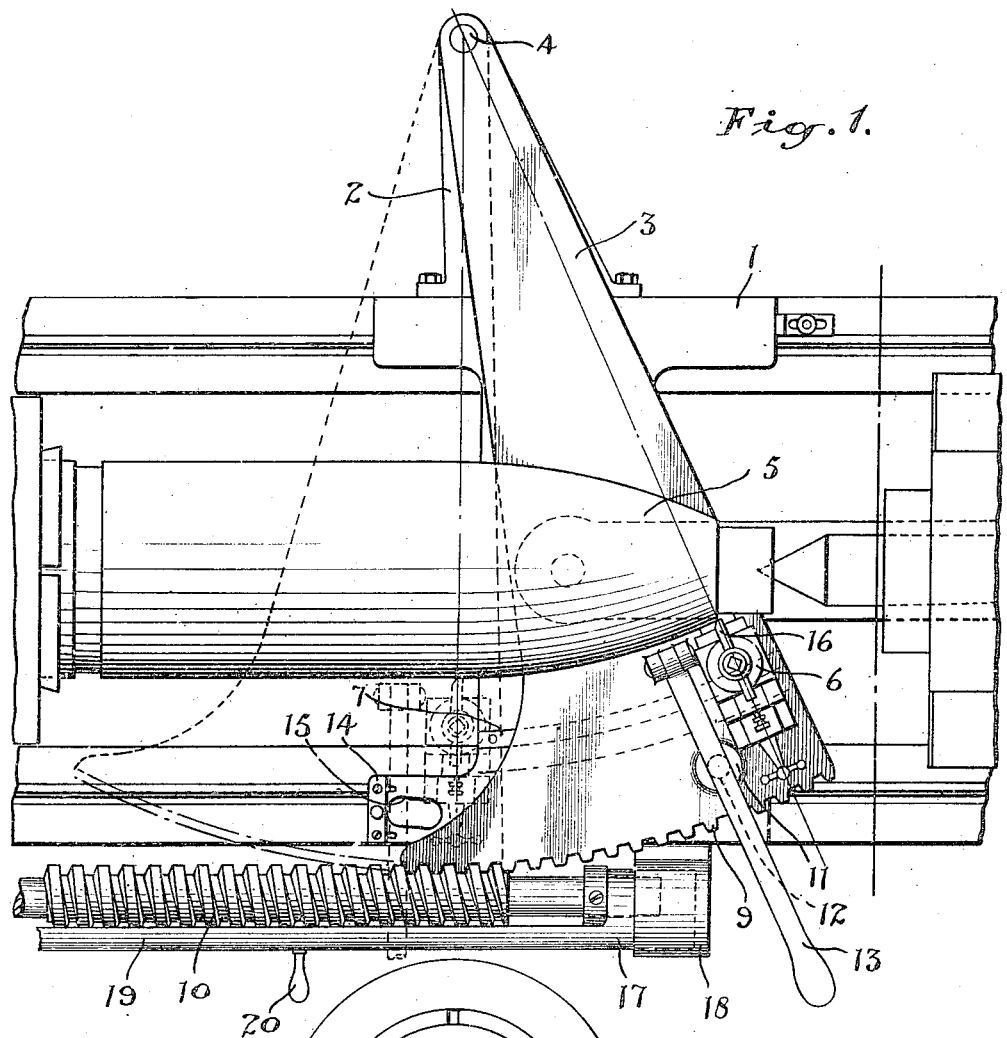
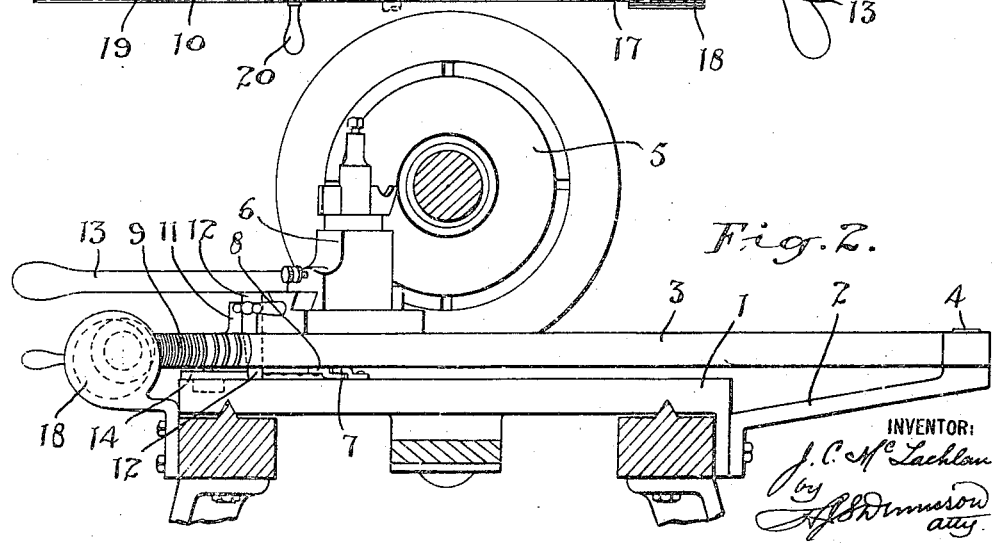

JOHN C. McLACHLAN, OF TORONTO, ONTARIO, CANADA.

SHELL-TURNING MACHINE.

1,252,129.  Specification of Letters Patent.  Patented Jan. 1, 1918.

Application filed March 26, 1917. Serial No. 157,292.

*To all whom it may concern:*

Be it known that I, JOHN CAMPBELL MC-LACHLAN, a subject of the King of Great Britain, and resident of the city of Toronto, county of York, Province of Ontario, in the Dominion of Canada, have invented certain new and useful Improvements in Shell-Turning Machines, described in the following specification and illustrated in the accompanying drawings, that form part of the same.

The principal objects of the invention are to simplify and cheapen the cost of machining the outer surface of shells and to accomplish the turning of the tapering nose and the cylindrical portion in a single operation.

The principal feature of the invention consists in the novel construction and arrangement of parts whereby the cutting tool is mounted on a supplemental carriage pivotally mounted on the main carriage and the pivotal carriage is provided with a quadrantal geared face operated by a screw to first swing the supplemental carriage on its pivot and then move both carriages longitudinally.

In the drawings, Figure 1 is a plan view of a portion of a lathe showing the application of my improved device.

Fig. 2 is a transverse sectional view through the lathe bed showing my improved device in elevation.

In the turning of the exterior surface of shells it has been the practice to cut the curved taper of the nose in one machine and then cut the cylindrical portion by a second operation in another machine, thus necessitating considerable handling and loss of time and labor and a consequent loss of money.

The present device eliminates this condition and in accomplishing this result I attach to the ordinary tool carriage 1 an extension bracket 2 to which is pivotally secured a supplemental segmental shaped carriage 3.

The pivot 4 is arranged as the center of the arc of the taper nose 5 of the shell and an adjustable tool holder 6 is arranged upon the upper side of said supplemental carriage at the side farthest from the head stock and preferably in radial alinement with the pivot.

The carriage 3 rests upon a supporting track 7 which is grooved to receive a bracket 8 secured to the underside of the supplemental carriage to prevent its lifting from its bed.

The carriage 3 is of quadrantal shape having the gear teeth 9 formed on the arc shaped edge, which teeth mesh with a screw shaft 10 operating at the front side of the lathe.

The pivotal carriage is provided with a boss 11 bored to receive a pin 12 carried on a lever 13 pivotally secured to the carriage and said pin extends through the carriage and rests upon the main carriage 1. A stop 14 is provided on the main carriage adapted to engage the pin 12 and a slotted recess 15 is arranged at the forward side of said stop, the pin 12 being adapted to drop into said recess.

The rotation of the screw shaft 10 swings the carriage 3 on its pivot carrying the cutting tool 16 in an arc-shaped path to cut the nose of the shell and when the tool reaches the limit of its arc in cutting the shell nose the pin 12 engages the stop 14 and the main carriage is carried longitudinally on its bed to effect the cutting of the cylindrical portion of the shell. The cutting operation is therefore continuous from the nose to the base of the shell.

The stop 14 is adjustably arranged upon the carriage 1 so that an accurate adjustment can be made for the point of change of direction of the cutting tool.

In order to return the carriage and tool to the commencing position it is necessary to disengage the screw shaft from the carriage 3 and to accomplish this the said shaft is journaled in eccentric bearings arranged in a rocking member 17 rotatably supported at the ends in the brackets 18, secured to the lathe bed, one only of which brackets is shown.

The bearing members 17 are connected by a bar 19 which is provided with a handle 20 by means of which both bearing supports are rotated in unison in order to move the screw shaft into or out of gear with the carriage 3. When the shaft is out of gear the carriage 1 may be moved in the return movement longitudinally in the ordinary manner.

The device is extremely simple, costs very little to install and will effect a very great saving in munition production.

The device is herein shown and described as a means for turning the exterior surface of shells but it may be adapted for use as a grinder for grinding tools for boring especially shaped interiors, such as the interior of a shell. In such application it is merely necessary to substitute a grinding tool for the cutting tool shown.

What I claim as my invention is:—

1. In a shell turning machine, the combination with the lathe bed and longitudinally sliding tool carriage, of a supplemental tool carriage pivotally mounted on said sliding carriage, and means adapted to first swing said pivotal carriage and then automatically discontinue the swinging movement and move both main and supplemental carriages longitudinally.

2. In a shell turning machine, the combination with the lathe bed and longitudinally sliding tool carriage, of a supplemental tool carriage pivotally connected to a fixed pivot arranged upon said sliding carriage and adapted to extend beneath the work and to swing in an arc on the radius of the curved taper of the shell, and means adapted to first swing said pivotal carriage to effect the cutting of the tapered end of the shell then to operate the carriage to move longitudinally.

3. In a shell turning machine, the combination with the lathe bed and sliding tool carriage, of a supplemental tool carriage pivotally mounted on said sliding carriage, and having gear teeth formed on the arc of its pivotal movement, a screw shaft adapted to mesh with said teeth, and means for locking said pivotal carriage with the sliding carriage to effect a longitudinal movement following a swinging movement.

4. In a shell turning machine, the combination with the lathe bed and sliding tool carriage, of a supplemental tool carriage pivotally mounted on said sliding carriage, and having gear teeth formed on the arc of its pivotal movement, a screw shaft adapted to mesh with said teeth, a stop arranged on the sliding carriage, a pin arranged on said swinging carriage adapted to engage said stop to move the sliding carriage longitudinally.

5. In a shell turning machine, the combination with the lathe bed and sliding tool carriage, of a supplemental tool carriage pivotally mounted on said sliding carriage, and having gear teeth formed on the arc of its pivotal movement, a screw shaft adapted to mesh with said teeth, means for moving said screw shaft into and out of mesh with the toothed quadrant of said pivotal tool carriage, and means for locking said pivotal carriage to said sliding carriage to travel it longitudinally.

6. In a shell turning machine, the combination with the lathe bed and sliding tool carriage, of a supplemental tool carriage pivotally mounted on said sliding carriage, and having gear teeth formed on the arc of its pivotal movement, a screw shaft adapted to mesh with said teeth and journaled at the ends in eccentrically rotatable bearings, means for rotating said bearings to move said shaft into and out of gear with said toothed quadrant, and means for locking the pivotal carriage to said sliding carriage to move the latter longitudinally.

J. C. McLACHLAN.

Copies of this patent may be obtained for five cents each, by addressing the "Commissioner of Patents, Washington, D. C."